(12) United States Patent  
Schilling et al.

(10) Patent No.: US 8,631,109 B2
(45) Date of Patent: Jan. 14, 2014

(54) SYSTEM AND METHOD FOR DYNAMIC CONTROL OF NETWORK MANAGEMENT TRAFFIC LOADS

(75) Inventors: Mark A. Schilling, Fort Collins, CO (US); Robert J. Wemsman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 733 days.

(21) Appl. No.: 12/464,668

(22) Filed: May 12, 2009

(65) Prior Publication Data

US 2010/0293266 A1 Nov. 18, 2010

(51) Int. Cl.
*G06F 15/173* (2006.01)

(52) U.S. Cl.
USPC .......................................... 709/223; 709/224

(58) Field of Classification Search
USPC ................................ 709/223–226
See application file for complete search history.

(56) References Cited

U.S. PATENT DOCUMENTS

| | | |
|---|---|---|
| 5,706,508 A | 1/1998 | Chen et al. |
| 5,960,176 A | 9/1999 | Kuroki et al. |
| 6,003,077 A | 12/1999 | Bawden et al. |
| 6,151,582 A | 11/2000 | Huang et al. |
| 6,173,323 B1 | 1/2001 | Moghe |
| 6,360,260 B1 | 3/2002 | Compliment et al. |
| 6,404,743 B1 | 6/2002 | Meandzija |
| 6,795,864 B2 * | 9/2004 | Connor ......................... 709/232 |
| 7,231,438 B1 * | 6/2007 | Kikuchi ........................ 709/224 |
| 7,406,515 B1 * | 7/2008 | Joyce et al. ................... 709/224 |
| 7,454,794 B1 * | 11/2008 | Hibberd ......................... 726/27 |
| 7,558,854 B2 * | 7/2009 | Nakahara et al. ............. 709/226 |
| 2002/0099829 A1 * | 7/2002 | Richards et al. ............. 709/227 |
| 2004/0003087 A1 * | 1/2004 | Chambliss et al. ........... 709/226 |
| 2008/0208949 A1 * | 8/2008 | Tanaka et al. ................ 709/201 |
| 2008/0209023 A1 * | 8/2008 | Mazzitelli .................... 709/223 |
| 2010/0241760 A1 * | 9/2010 | Zhang et al. ................. 709/235 |

* cited by examiner

*Primary Examiner* — Brian P Whipple

(57) ABSTRACT

A system and method for dynamically controlling network management traffic load on network devices is provided. A network management module on a network management server has a request module for requesting management data from a network device. A storage device accessible by the network management module stores a list of the network devices and associated management request limits representing a number of management requests the network management module is allowed to send to a particular network device for processing at a time. A queue module on the network management module stores a management request from the network management module when a number of outstanding management requests exceeds the management request limit and places the management request in a queue. The queue module also forwards a management request from the queue to a network device when the network management module receives a response from the network device.

20 Claims, 4 Drawing Sheets

SYSTEM AND METHOD FOR DYNAMIC CONTROL OF NETWORK MANAGEMENT TRAFFIC LOADS

BACKGROUND

Management of networks and devices in communication with the network can be an important part of day to day network operations. Network management software is frequently used to manage networks and devices. Also, a network management protocol may be used by the network management software to communicate with network devices. The network management software can use the network management protocol to perform various operations, such as discovering network devices or monitoring network devices.

One type of often used network management protocol is the Simple Network Management Protocol (SNMP). SNMP is used in network management systems to monitor network attached devices for conditions that warrant administrative attention. SNMP exposes management data in the form of variables on the managed systems, which describe the system configuration. These variables can then be queried and sometimes set by managing applications.

Often where SNMP is used, there may be a number of systems to be managed and one or more systems managing them. A software component called an agent runs on each managed system and reports information via SNMP to the managing systems. SNMP agents expose management data on the managed systems as variables (such as "free memory", "system name", "number of running processes", "default route"). The managing system can retrieve the management data through various protocol operations or the agent can send data without being asked using other various protocol operations. Management systems can also send configuration updates or controlling requests through a protocol operation to actively manage a system. Configuration and control operations may be performed when changes are needed to the network infrastructure. Monitoring and discovery operations may be performed on a more regular basis.

Modern network management software, particularly management software making use of multithreading and parallel processing, can generate large amounts of network traffic to network devices, such as SNMP monitoring or discovery requests. The devices can be overwhelmed by the management requests and fail to function properly.

DETAILED DESCRIPTION

Figure 1:
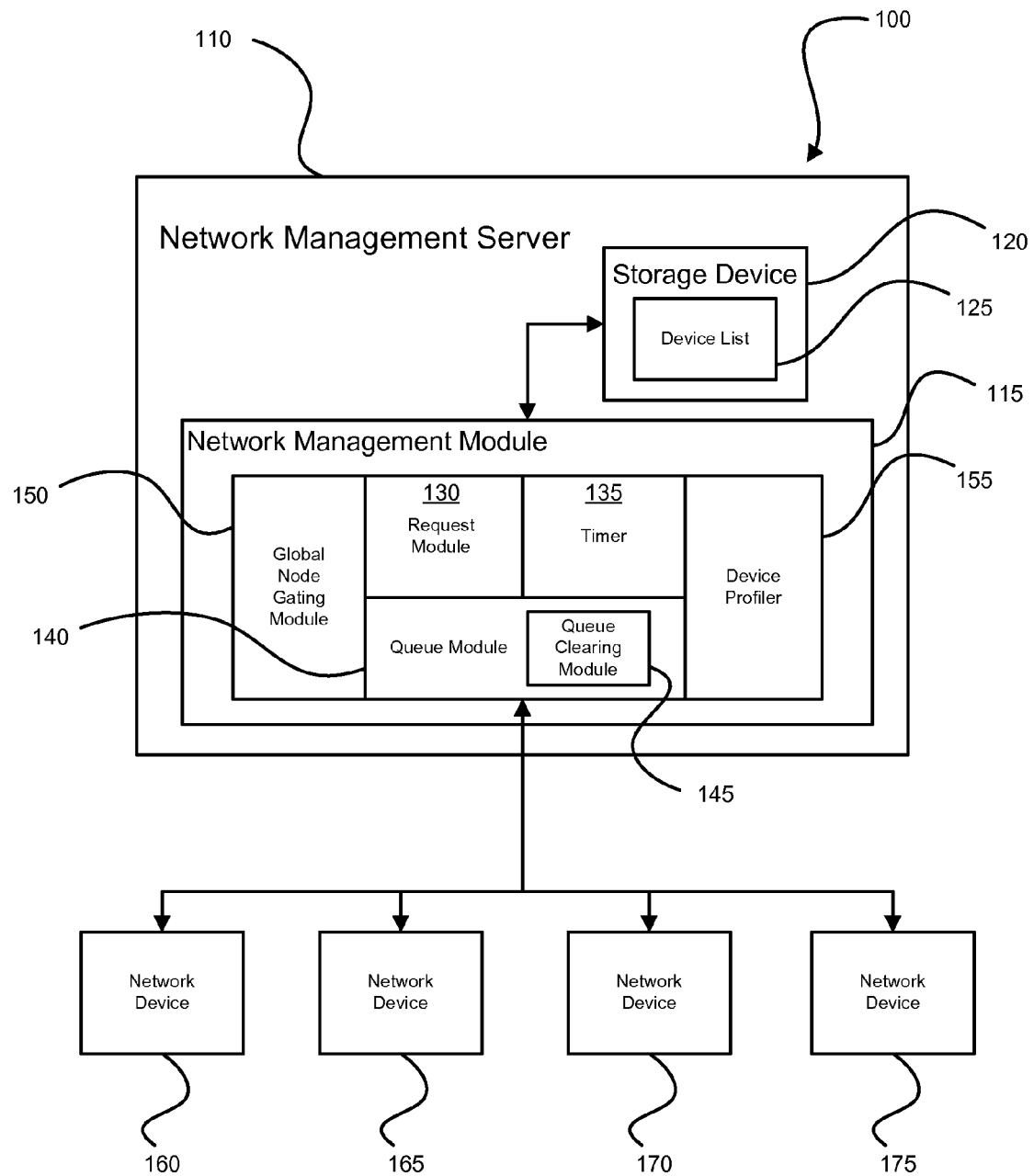
FIG. 1 is a block diagram of a system for dynamically managing traffic loads to network devices in accordance with an embodiment.

Additional features and advantages of the invention will be apparent from the detailed description which follows, taken in conjunction with the accompanying drawings, which together illustrate, by way of example, features of the invention. Reference will now be made to the exemplary embodiments illustrated, and specific language will be used herein to describe the same. It will nevertheless be understood that no limitation of the scope of the invention is thereby intended.

Management of networks and devices in communication with a network can be an important part of routine network operations. Network management software is frequently used to manage networks and devices. A network management protocol may also be used by the network management software to communicate with network devices. The network management software can use the network management protocol to perform various operations, such as discovering network devices or monitoring network devices.

One type of network management protocol is the Simple Network Management Protocol (SNMP). The following description will primarily describe a system using SNMP, but other protocols and/or methods of implementing the system and method may be used.

SNMP is part of the Internet network management architecture. SNMP is a protocol for collecting and organizing information. Most toolsets implementing SNMP offer some form of discovery mechanism, a standardized collection of data common to most platforms and devices, to get a new user or implementer started. One of these features is often a form of automatic discovery, where new devices discovered in the network are polled automatically. Common uses of discovery include discovering or detecting devices and connectivity to the devices. SNMP also is used for monitoring network devices. An SNMP monitor can be a dynamic tool for querying multiple object identifiers (OID) from a remote SNMP agent and perform calculations on the returned values.

Network management software and devices typically use the management protocol to query network devices for management data. If not throttled, such management traffic can overload a device causing CPU spikes, memory issues, and slow performance. Current systems have difficulty keeping management traffic flow for a given device at a manageable level.

Prior solutions have typically issued management requests in a serialized manner to spread out the load on the target device. However, the performance of the management application is degraded because the time necessary to retrieve management data grows with such a solution. The management application is not able to retrieve management data as frequently or as rapidly as would be desirable to optimally perform discovery, monitoring, and other operations. Some prior solutions have made use of atomic requests, or a set of operations that can be combined such that to the rest of the system the operations are treated as a single operation with only two possible outcomes: success or failure. However, such solutions have not benefited from performance enhancements and richer data mining facilitated by more advanced management systems. Further, advanced network management software can generate large amounts of network traffic which can overwhelm devices and cause them to cease functioning properly.

As an example, with a virtual local area network (VLAN) environment, the discovery process may perform a query for attached network devices and find that a node has 4,000 interfaces. Discovery may then send 4,000 requests for information simultaneously to each interface. Where the environment is a VLAN, the reality may be that there is a single device that has now received 4,000 simultaneous management requests. Such a load can cause a device to slow, give an incorrect or incomplete response, or cease responding altogether.

A system and method is provided for keeping management traffic flow for a given device at a manageable level, while still being able to take advantage of various advanced management capabilities. The system and method can also help avoid overwhelming a device by sending too many parallel requests.

Referring to FIG. 1, a system 100 is shown for dynamically controlling network management requests to network devices 160, 165, 170, 175. The system may include a network management server 110 for managing network devices. A network management module 115 may be included on the network management server. The network management module can be configured to manage network devices. The network management module may comprise hardware, software and/or firmware for managing network devices and network device information.

Examples of information managed by the network management module 115 include presence and/or type of network device on a network, or the state of the network device. The network management module can use discovery and/or monitoring processes to discover and manage network device information.

A request module 130 can be included on the network management module 115 and can be configured to send discovery or monitoring requests (also referred to herein as "management requests") for information to the network devices. The request module can send the requests via a network protocol, such as SNMP as described above. In one aspect, the request module can be configured by a user to set a maximum number of concurrent management requests at specific node or group of nodes. In one aspect, the request module can be configured to limit a number of parallel management requests that can be made to a single node. Discovery requests can be used to discover network devices and/or information about the network devices. Monitoring requests can be used to monitor the state of network devices.

After discovery of a device, the system can be configured to not perform discovery of that device again for a specified period of time. For example, after discovering a network device, the system may be configured to delay discovery for that device again for another 24 hours. During that 24 hour period, monitoring requests may continue. In other words, status polling may have priority over rediscovery of a device in some embodiments.

The network management module 115 can include a global node gating module 150. The global node gating module can be configured to limit a number of management requests sent over all network server nodes. The request module 130 could be configured to perform this task. In one aspect, the request module may be configured to limit a number of management requests at all nodes. In another aspect the request module may be configured to limit a number of management requests at individual nodes or subsets of nodes. In this aspect, a global node gating module may be useful to easily and efficiently place a uniform management request limit at all nodes.

A storage device 120 may be included in the system 100 and be accessible by the network management module 115. The storage device can be any form of electronic storage device. Some examples of storage devices can include a hard drive, flash memory, random access memory, or any other electronic storage device as is apparent to one having skill in the art. The storage device can be configured to store a list 125 of network devices. The storage device can also store a management request limit associated with each respective network device. The management request limit can represent a number of management requests the request module is allowed to send to any particular network device for processing at a time.

The system 100 may include a queue module 140 on the network management module 115. The queue module can be configured to store management requests from the network management module when a number of outstanding management requests exceeds the management request limit and place the management request in a queue. The queue module can also be configured to forward a management request to the network device from the queue when the network management module receives a response from the appropriate network device. In one aspect, the queue module can be configured to forward low impact requests to the network device regardless of the number of outstanding management requests. In one aspect, a monitoring request may be a low impact request. A request that involves many objects and interfaces may be considered high impact. Discovery may request a lot of objects across a large number of interfaces, such as with a VLAN as described above. A discovery request can therefore be a high impact request. In a status poll, a request may be for a particular interface/address and ask for a relatively small number of objects. Thus, a status poll may be a low impact request.

As an example of operation of the device as described thus far, a management request limit for a given device may be set at ten concurrent requests. The threshold number of requests may be any number suitable for the device and may in reality be a much higher number. If the network management module has sent a number of management requests to the network device and there are at least ten outstanding requests for which a response has not been received from the device, any further management requests to the device can be placed in the queue. When a response is received from the network device, the queue module can send a request from the queue to the network device for response, and so forth.

A timer 135 may be included on the network management module 115. The timer can be configured to track the amount of time elapsed before a network device responds to the management request. In one aspect, the timer may be a dynamic timing module capable of determining how fast a network device is typically capable of responding to management requests. The timer can be adjustable manually or automatically to accommodate slower or faster responding network devices. In this way, a slower network device can be allowed more time to provide responses to management requests without the network management module determining that the device is down, disconnected, or otherwise unavailable. In one aspect, the timer can also be configured to clear the queue if the network device has not responded to the management request within a predetermined amount of time. Clearing the queue can allow the system to reallocate memory or other system resources to help the system function more efficiently. The queue may be cleared using a queue clearing module 145. A predetermined amount of time may be used to set a network device timeout value. Once the timer has reached the timeout value, the network device may be considered unresponsive and/or unavailable and the queue clearing module can clear the queue.

The system 100 can also include an interface to allow a user to manage the network. The interface can be a user interface (UI), and in one aspect can allow a user to control the network management module, request module and queue module. The interface may comprise a web UI and/or a network management or server-side UI. The interface may comprise a software application UI on a client workstation.

The system 100 may further comprise a device profiler 155 on the network management module 115. The device profiler can be configured to determine management request processing capabilities of network devices and to set management request limits according to the determination. The device profiler can be in communication with the storage device 120 to manage and update the device list 125.

In one aspect, the system 100 may be configured to account for other non-manageable requests to the devices and set the management request limits accordingly so as to not overwhelm the device. In another aspect, if a device's responsiveness is slowing, this may indicate that the device is being overloaded. In this situation, the system may be configured to send fewer management requests to the device to avoid overwhelming the device. If the device responsiveness increases, more management requests may be sent to the device.

Maintaining proper function and operation of network servers and devices can be an important consideration in network management. With increasingly sophisticated networks, systems, and algorithms used in said networks or systems, there can be several inputs trying to communicate with network devices all at the same time. Using the system and method described herein it is possible to prevent overwhelming network devices with management requests. The system and method presented herein can provide a performance boost to network management devices and/or software because memory that otherwise may be used to hold unprocessed requests on the device can be freed. Also, the system and method can allow discovery processes to proceed faster. Since the system and method provide for determination of non-responsive devices through timing mechanisms, discovery may not need to be performed as often for such devices. Through use of the system and method, devices no longer receive more requests than the devices are able to handle, which previously would result in incorrect or incomplete responses.

Figure 2:
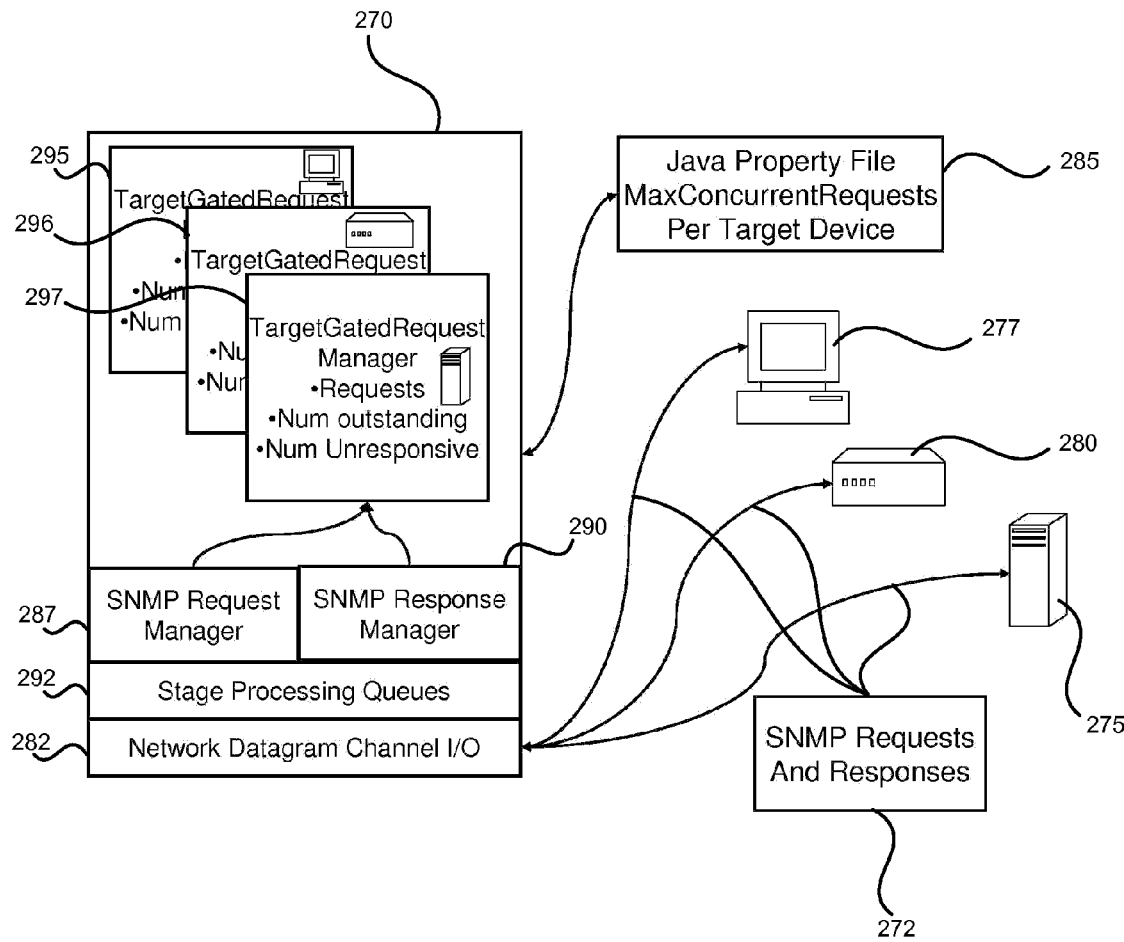
FIG. 2 is block diagram of an expanded view of a staged SNMP architecture in accordance with an embodiment.

FIG. 2 represents a staged SNMP architecture 270 for dynamically controlling network management requests to network devices similar in many ways to the system of FIG. 1. SNMP responses and requests 272 can be sent to and received from network devices 275, 277, 280 through a network datagram channel input/output (I/O) 282. A Java Property File 285, similar to the device list described above for FIG. 1 can include a list of network devices and the maximum number of concurrent requests (MaxConcurrentRequests) per target network device. This maximum number of requests is similar to the management request limit described above for FIG. 1. The Java Property File is accessible by the SNMP staging module for managing the number of requests to any particular network device.

The SNMP request manager 287 can be configured to send management requests to the network devices and the SNMP response manager 290 can be configured to receive responses to management requests from the network devices. A TargetGatedRequest manager 295, 296, 297 can track the number of requests from the SNMP request manager, the number of outstanding management requests to which response has not been received, and the number of unresponsive requests and/or the identification of unresponsive devices.

The TargetGatedRequest manager 295, 296, 297 can be used to place management requests from the SNMP request manager 287 in a stage processing queue 292 on a queue module when the number of outstanding requests exceeds the maximum number of concurrent requests for the target device. The TargetGatedRequest manager can be used to clear the queue when a target device is unresponsive after a predetermined period of time or to a specified number of management requests. The TargetGatedRequest manager can include a timer for timing the responsiveness of network devices. The TargetGatedRequest manager can include a management task for each respective network device.

Figure 3:
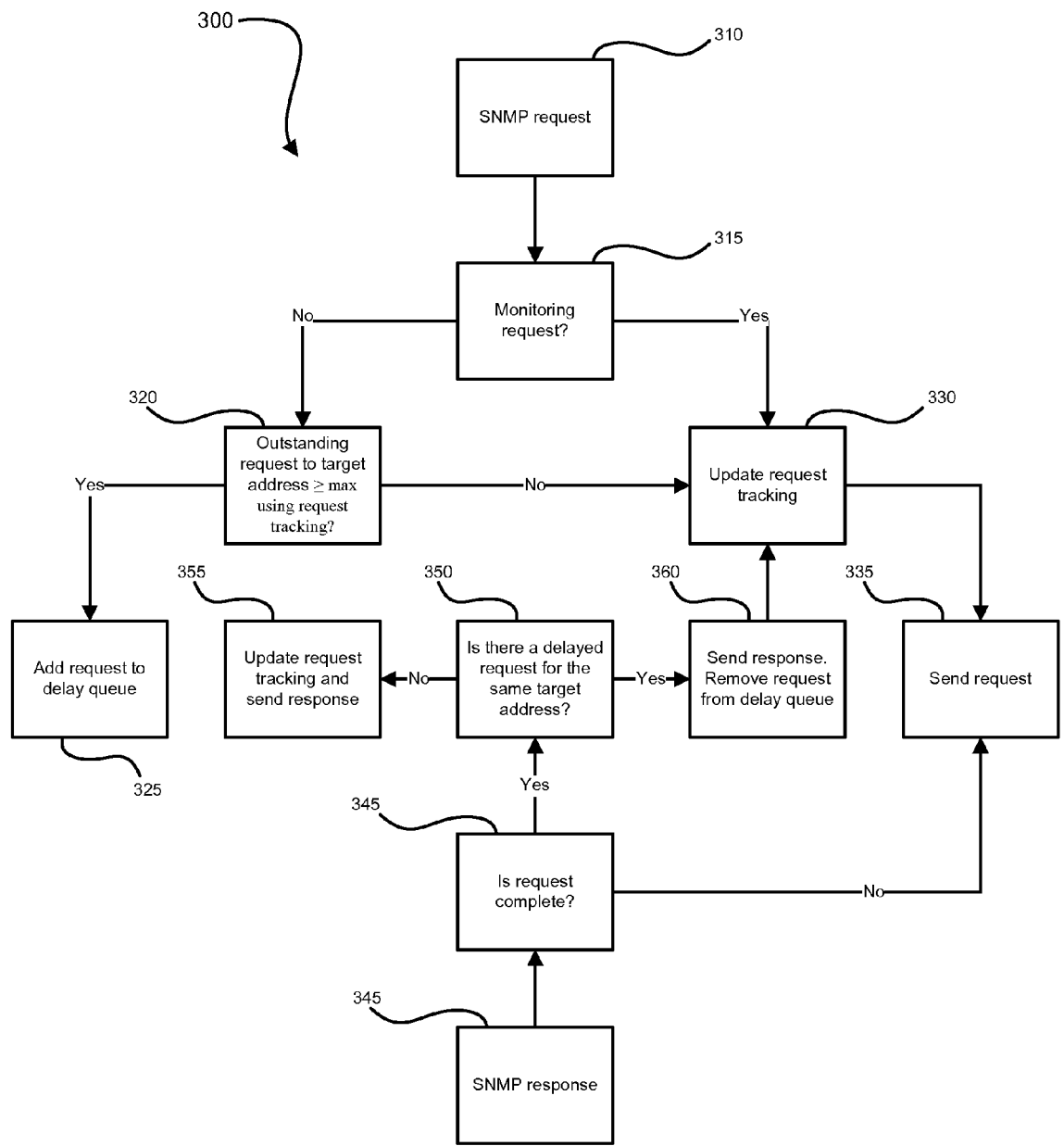
FIG. 3 is a flow diagram for use in dynamically managing management traffic loads to network devices in accordance with an embodiment.

FIG. 3 is a flow diagram of a method 300 for use in a system for dynamically managing traffic loads to network devices in accordance with an embodiment. The network management module may attempt to send an SNMP request 310. The system determines 315 whether the request is a monitoring request or another type of request. As described above, low impact requests can be forwarded without throttling in accordance with one aspect. If the request is a monitoring request, the request tracking is updated 330 to note the request and where that request is going to be sent. The request can then be sent 335 to a network device. If the request is not a monitoring request or low impact request, the system can determine 320 whether the number of outstanding requests at the target address or device is greater than or equal to the maximum allowed concurrent requests for the target device. The request tracking service can be used to determine the number of outstanding requests as compared to the number of concurrent allowable requests per device. If the number of outstanding requests at the target address or device is greater than or equal to the maximum allowed concurrent requests for the target device then the request may be added 325 to a delay queue. If the number of outstanding requests at the target address or device is not greater than or equal to the maximum allowed concurrent requests for the target device, the update request tracking service can be updated 330 to note the request and where the request is going to be sent.

After receiving a management request, a network device can send a response 340. The response can be an SNMP response. When the response is received, the system can determine 345 whether the request is complete. If the request is not complete, the request can be sent 335 again. If the request is complete, the system can determine 350 whether there is a delayed or queued request for the same target address or device. If there is not a queued request for the network device, the request tracking can be updated 355 to reflect receipt of the response and the response can be sent or delivered to the network management module. If there is a queued request for the network device from which the response was received, the response can be sent 360 or delivered to the network management module, the queued request can be removed from the delay queue, the request tracking can be updated 330 and the request sent 335 to the network device.

Figure 4:
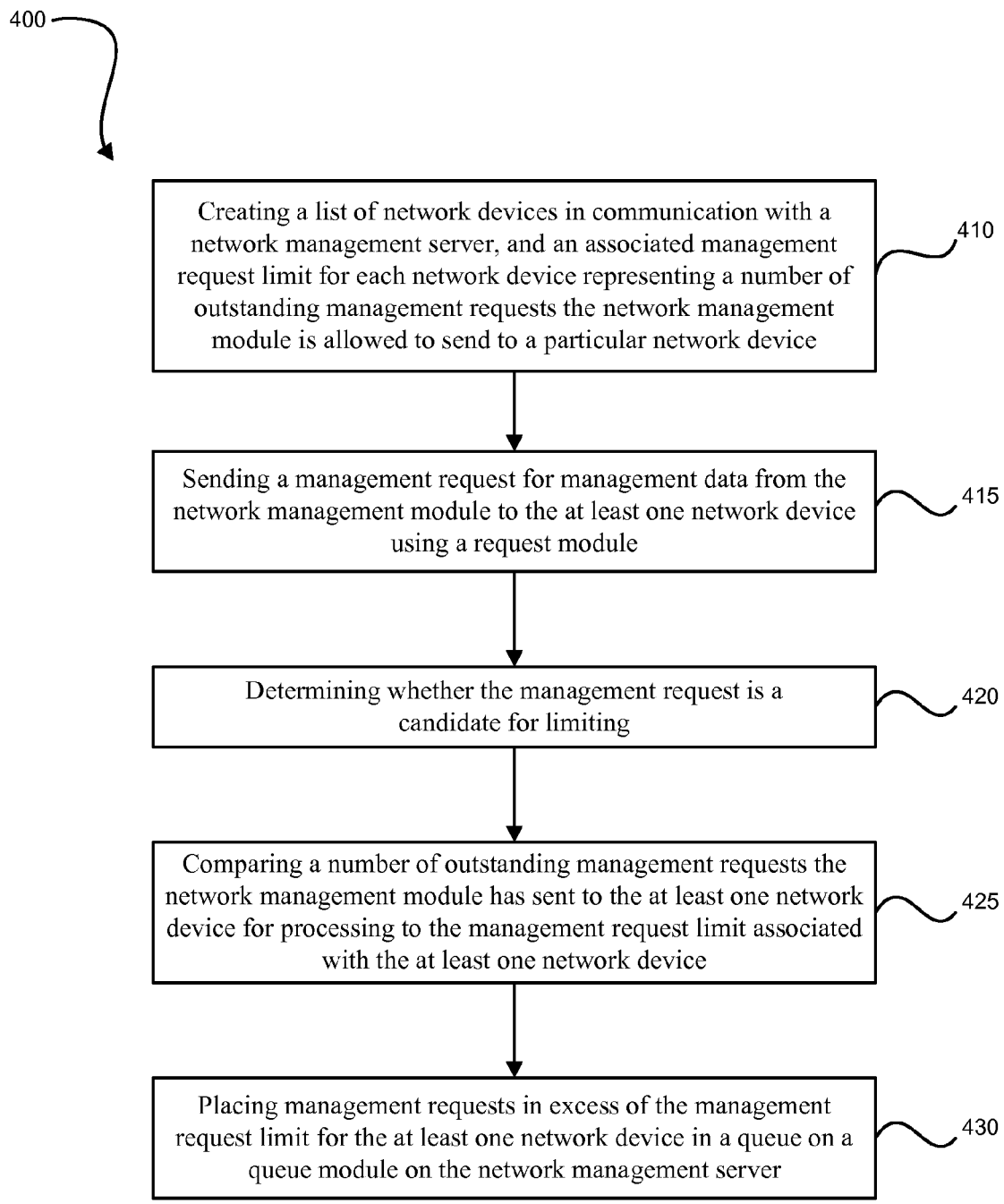
FIG. 4 is a flow chart of a method for dynamically managing management traffic loads to network devices in accordance with an embodiment.

FIG. 4 illustrates a flow chart of a method 400 for dynamically managing traffic loads to network devices in accordance with an embodiment. In one operation, a list may be created 410 using a network management module on a network management server. The list can include a list of network devices in communication with the network management server and associated management requests limit for the network devices. The management request limit can represent a number of outstanding management requests the network management module is allowed to send to a particular network device for processing at a time. The data structure can be stored on a storage device accessible by the network management module. The network management module can send 415 a management request for management data to the network device using a request module in another operation. The network management module can determine 420 whether the management request is a candidate for limiting. A number of outstanding management requests the network management module has sent to the network device for processing can be compared 425 to the management request limit associated with the network device. Management requests in excess of the management request limit for the network device can be held 430 in a queue on a queue module on the network management server. In a further operation a management request can be forwarded from the queue to the network device when the network management module receives a response from the network device.

In one embodiment, determining whether the management request is a candidate for limiting comprises determining whether the management request is a low or high impact management request. In this embodiment, low impact management requests may be forwarded to the network device without comparison of outstanding management requests to the management request limit.

In one aspect, the queue may be cleared when the network device is not responding to network management requests. In another aspect, the method further comprises setting a global node setting on the network management module to limit a number of management requests to network devices at all network server nodes. In a different aspect, the method includes configuring the network management module to set a maximum number of concurrent management requests at specific node or region of nodes. In yet another aspect, the method includes creating network device profiles using a device profiler. The device profiler can be configured to determine management request processing capabilities of network devices. The device profiler can also be configured to set the management request limit according to said determination.

In accordance with one embodiment of the method, sending the management request comprises discovering or monitoring the a network device. In a further aspect of this embodiment, monitoring may comprise polling a state of the at least one network device.

In accordance with an embodiment, the method may further comprise timing a length of time for the at least one network device to respond to the management request using a timer. In a further aspect of this embodiment, the method includes manually or automatically adjusting the timer to accommodate slower responding network devices.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for controlling network management traffic load on network devices, comprising:
   creating a list of network devices in communication with a network management server, and an associated management request limit for each network device if the device is managed by the network management server, representing a number of outstanding management requests a network management module on the network management server is allowed to send to a particular network device;
   sending a management request for device management data from the network management module to a network device using a request module;
   determining whether the management request is a candidate for limiting;
   comparing a number of outstanding management requests the network management module has sent to the network device for processing to the management request limit associated with the network device; and
   placing management requests in excess of the management request limit for the network device in a queue on a queue module on the network management server.

2. A method in accordance with claim 1, further comprising forwarding at least one management request from the queue to the network device when the network management module receives a response from the network device.

3. A method in accordance with claim 1, further comprising storing the list of network devices and associated management request limits on a storage device accessible by the network management module.

4. A method in accordance with claim 1, wherein determining whether the management request is a candidate for limiting further comprises:
   determining whether the management request is a low or high impact management request, wherein the high impact management request is a request which involves more than a predetermined number of objects or interfaces and the low impact management request is a request which involves fewer than the predetermined number of objects or interfaces; and
   forwarding low impact management requests to the network device without comparison of outstanding management requests to the management request limit.

5. A method in accordance with claim 1, further comprising clearing the queue when the network device is not responding to network management requests.

6. A method in accordance with claim 1, further comprising setting a maximum number of concurrent management requests at specific node or group of nodes.

7. A method in accordance with claim 1, further comprising creating network device profiles using a device profiler configured to determine management request processing capabilities of the network device and set the management request limit according to the determination.

8. A method in accordance with claim 1, wherein sending the management request comprises sending at least one of a discovery request and a monitoring request.

9. A method in accordance with claim 1, further comprising timing a duration taken for the network device to respond to the management request using a timer.

10. A method in accordance with claim 9, further comprising manually or automatically adjusting the timer to accommodate network devices with varying response times.

11. A system for dynamically controlling network management traffic load on network devices, comprising:
   a network management server;
   a network management module on the network management server, configured to manage a network device;
   a request module on the network management module configured to request device management data from the network device; and
   a queue module on the network management module configured to store a management request from the network management module when a number of outstanding management requests exceeds a management request limit, where the management request limit is applied if the network device is managed by the network management server.

12. A system in accordance with claim 11, further comprising a storage device accessible by the network management module configured to store a list of network devices and an associated management request limit for each network device representing a number of outstanding management requests the network management module is allowed to send to the network device.

13. A system in accordance with claim 11, wherein the queue module is further configured to place the management request in a queue and to forward at least one management request from the queue to the network device when the network management module receives a response from the network device.

14. A system in accordance with claim 11, wherein the queue module is configured to forward monitoring requests to the network device regardless of a number of outstanding management requests.

15. A system in accordance with claim 11, further comprising a queue clearing module configured to clear the queue when the network device is not responding to network management requests.

16. A system in accordance with claim 11, further comprising a device profiler configured to determine management request processing capabilities of the network device and to set the management request limit according to the determination.

17. A system in accordance with claim 11, further comprising a timer configured to time a duration taken for the network device to respond to the management request.

18. A system in accordance with claim 17, wherein the timer is adjustable manually or automatically to accommodate network devices with varying response times.

19. A system in accordance with claim 11, wherein the request module is configured to limit a number of parallel management requests at a single node.

20. A system for dynamically controlling network management requests to network devices, comprising:
  a network management server;
  a network management module on the network management server, configured to manage information about a network device;
  a request module on the network management module configured to send discovery and monitoring requests to the network device for device management data;
  a storage device accessible by the network management module configured to store a list of network devices and an associated management request limit for each network device if the device is managed by the network management server, representing a number of outstanding management requests the network management module is allowed to send to the network device;
  a queue module on the network management module configured to store a management request from the network management module when a number of outstanding management requests exceeds the management request limit and place the management request in a queue, the queue module also being configured to forward at least one management request from the queue to the network device when the network management module receives a response from the network device; and
  a timer on the network management module configured to track a duration taken for the network device to respond to the management request and to clear the queue if the network device has not responded to the management request within a predetermined amount of time.

* * * * *